March 3, 1970  E. E. BREUNING  3,498,324
QUICK CONNECT HIGH PRESSURE COUPLING
Filed March 17, 1967  4 Sheets-Sheet 1

INVENTOR.
ERICH E. BREUNING
BY
Woodling, Krost, Granger + Rust
Attys.

March 3, 1970  E. E. BREUNING  3,498,324
QUICK CONNECT HIGH PRESSURE COUPLING
Filed March 17, 1967  4 Sheets-Sheet 2

INVENTOR.
ERICH E. BREUNING
BY
Woodling Krost Granger & Rust
Attys.

March 3, 1970 E. E. BREUNING 3,498,324
QUICK CONNECT HIGH PRESSURE COUPLING
Filed March 17, 1967 4 Sheets-Sheet 3

INVENTOR.
ERICH E. BREUNING
BY
Woodling Kwost Granger Rust
Attys.

March 3, 1970   E. E. BREUNING   3,498,324
QUICK CONNECT HIGH PRESSURE COUPLING
Filed March 17, 1967   4 Sheets-Sheet 4

INVENTOR.
ERICH E. BREUNING
BY
Woodling, Krost, Granger + Krost
Attys.

United States Patent Office 3,498,324
Patented Mar. 3, 1970

3,498,324
QUICK CONNECT HIGH PRESSURE COUPLING
Erich E. Breuning, Union City, Pa., assignor to Snap-Tite, Inc., a corporation of Pennsylvania
Filed Mar. 17, 1967, Ser. No. 624,067
Int. Cl. F16l 37/22, 37/28; F16k 39/04
U.S. Cl. 137—614.04                                    1 Claim

ABSTRACT OF THE DISCLOSURE

A quick connect and disconnect coupling comprising a female socket member and a male nipple member insertable thereinto. In connected condition the members are held together by ball detents carried by the socket member and extending into a groove on the nipple member and held in this position by a locking sleeve which is retractable when it is desired to disconnect the two members.

Each member has a primary valve normally closed which has a secondary flow passage therethrough with a secondary valve in each, normally maintained closed. As the nipple and socket members are brought together the secondary valves first engage each other and open causing a flow through the secondary flow passages from the high pressure side to the low pressure side of the coupling. This flow causes at least a momentary drop (under normal circumstances and particularly under static head conditions) in the high pressure which is acting toward keeping the associated primary valve closed and further manual bringing together of the members is permitted because of this pressure drop. This bringing together of the members causes the primary valves to be engaged and opened.

---

The primary object of the present disclosure is to provide a quick connectable coupling which can be manually connected against the force generated by a high internal fluid pressure.

Another object is the unique construction and arrangement of the primary and secondary valving arrangement in the quick connect coupling.

Other objects and a fuller understanding of this invention may be had by referring to the following description and claims, taken in conjunction with the accompanying drawings, in which:

Figure 1:
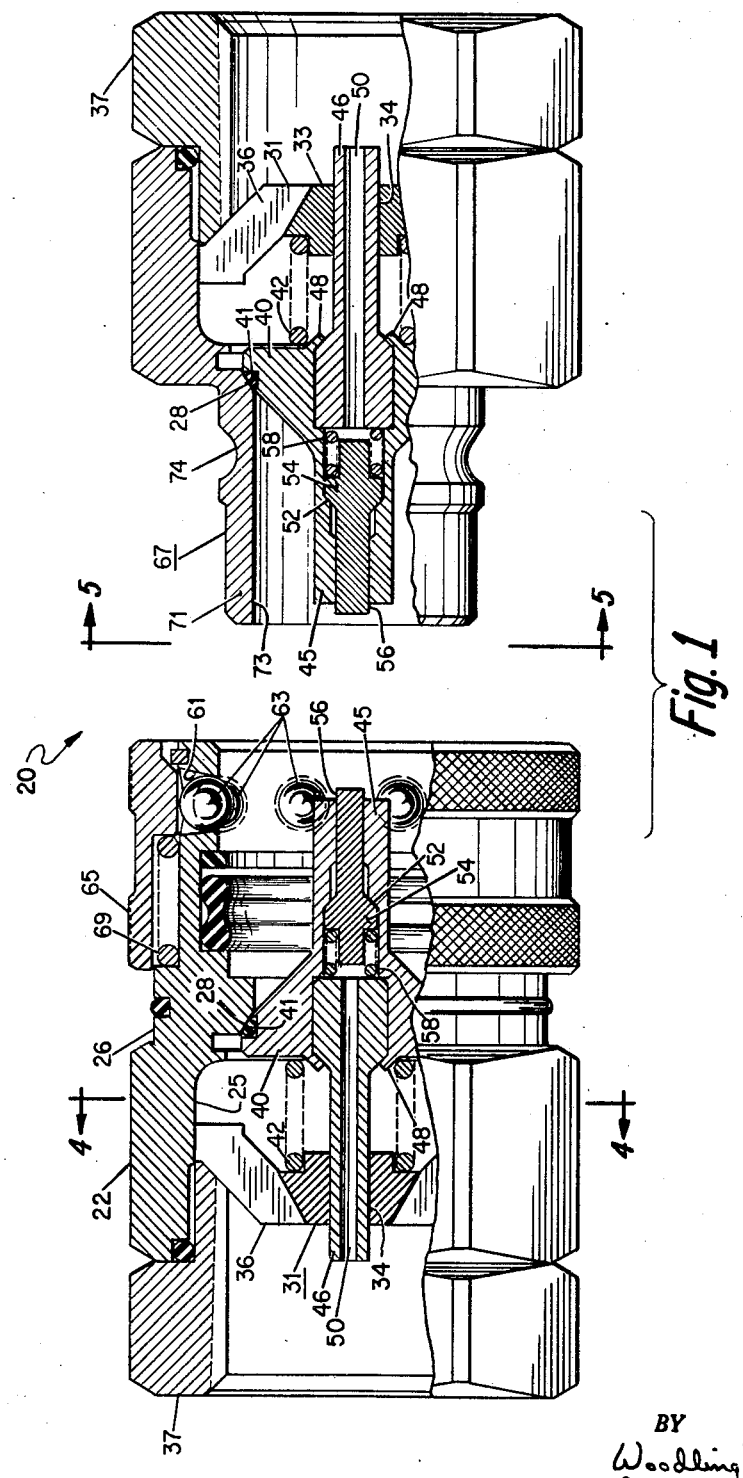
FIGURE 1 is an elevational view partially in section of the coupling of the present invention in disconnected condition.

The quick connect coupling of the present invention has been indicated generally by the reference numeral 20 and as mentioned hereinabove, the advantages of the present design stem from the ability of this coupling to be connectable at high fluid pressures. The coupling comprises a socket body 22 which has inner and outer surfaces 25 and 26, respectively, with the inner surface defining a primary passage extending therethrough. Wall means 28 serve to define a primary valve seat in the primary passage 25. A valve guide and stop 31 is positioned in the primary passage and has a central portion 33 with an opening 34 extending therethrough and a plurality of angularly spaced arms 36 which extend generally radially of the primary passage to engage the inner surface 25 thereof as shown. An adapter 37 is threadably secured to the socket body 22 and engages the valve guide and stop 31 as shown to hold the same in position in the primary passage.

A primary valve 40 is provided which carries a seal 41 and which is movable between open (FIGURE 3) and closed (FIGURE 1) positions relative to the primary valve seat 28 and a first spring means 42 constantly urges the primary valve to closed position. The spring means 42 as will be seen from the accompanying figures engages the primary valve 40 at one end and the central portion 33 of the valve guide and stop 31 at the other end. The primary valve 40 is provided with a first axial extension 45 which is formed integrally therewith and a second axial extension 46 which is secured to the primary valve by the swedging over of portions 48 of the primary valve 40. The second axial extension 46 is located in the opening 34 in the central portion of the valve guide and stop 31 and serves to guide the primary valve in its movement between the above referred to open and closed positions. Wall means 50 serve to define a secondary passage which extends through the primary valve 40 by way of the first and second axial extensions 45 and 46, respectively. This wall means also serves to define a secondary valve seat 52 in this secondary passage 50. A secondary valve 54 is located within the passage 50 and is movable between open (FIGURE 2) and closed (FIGURE 1) positions relative to the secondary valve seat 52 and in the closed position it will be observed that this secondary valve 54 has a portion 56 which extends axially outwardly a slight distance beyond the extreme axial end of the first axial extension 45. Second spring means 58 constantly urges the secondary valve to its closed position.

It will be noted from observing the hereinabove described structure that the secondary valve is substantially smaller in cross-section than the primary valve 40. It will therefore be apparent to those skilled in the art that fluid pressure acting in the second end (left as viewed in FIGURE 1) of the socket body 22 or in the area of the adapter 37 will exert a correspondingly larger total force on the primary valve tending to keep it closed than on the secondary valve tending to keep it closed. Consequently, it will take a smaller force to open the secondary valve than to open the primary valve.

Figure 2:
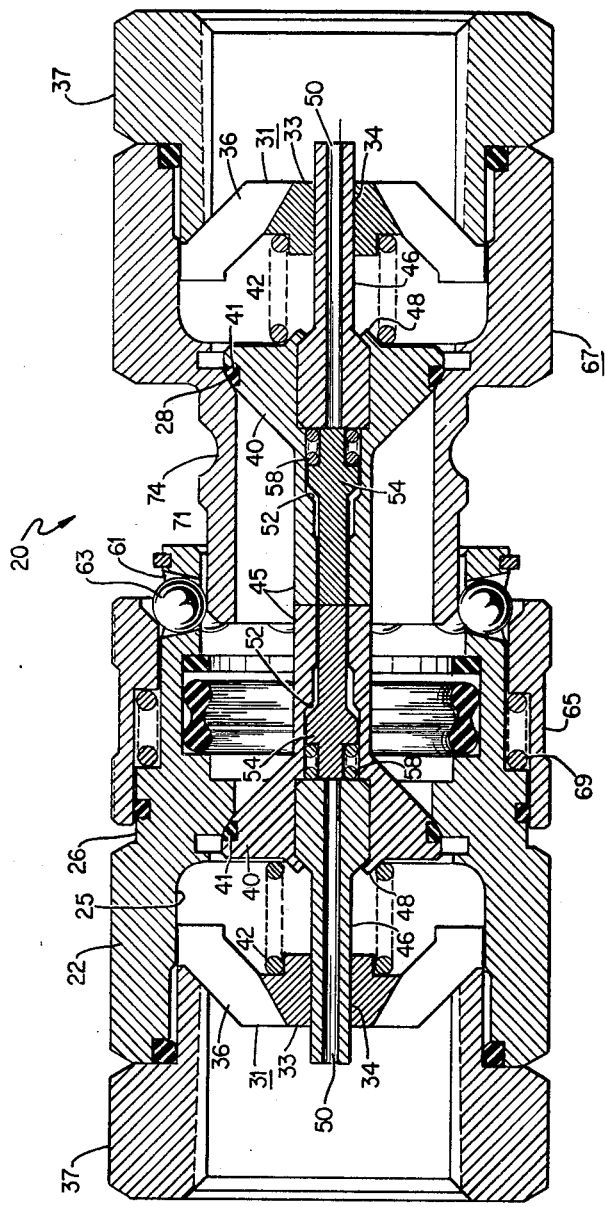
FIGURE 2 is a similar side elevational view of the coupling of the present invention showing the same in a condition intermediate the uncoupled condition shown in FIGURE 1 and the completely coupled condition shown in FIGURE 3.

Wall means 61 serve to define a plurality of circumferentially spaced detent receiving sockets which extend from the outer surface of the socket body to the inner surface thereof. Ball detents 63 are located in each of the sockets and are projectable into and out of the primary passage defined by the inner surface 25. A locking sleeve 65 surrounds the detents and is movable between a locked position (FIGURE 1) whereat the detents are maintained projected into the primary passage and an unlocked position (to the left as seen in FIGURE 1) whereat the detents may be moved radially outwardly of the primary passage to receive a nipple member 67. A locking spring 69 serves to constantly urge the locking sleeve to the locked position shown in FIGURE 1.

Figure 3:
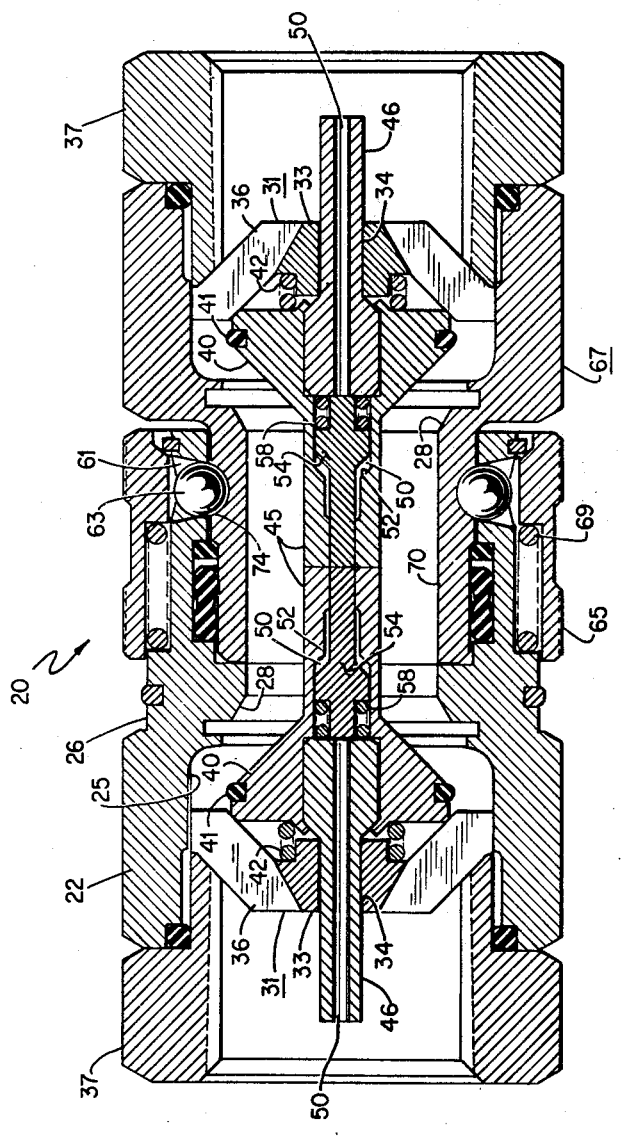
FIGURE 3 is a similar side elevational view of the coupling of the present invention showing the same in completely connected condition.
Figure 4:
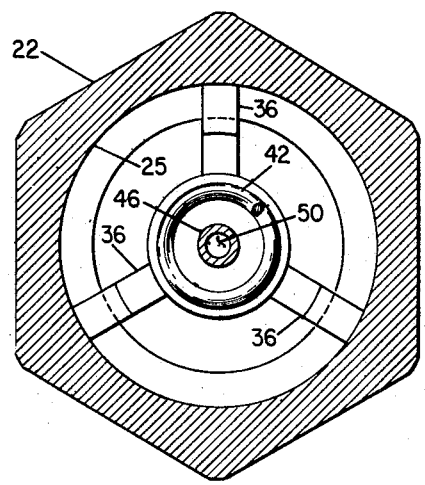
FIGURE 4 is a view taken generally along the line 4—4 of FIGURE 1.
Figure 5:
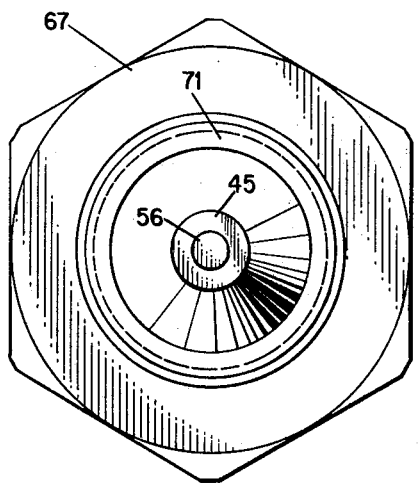
FIGURE 5 is a view taken generally along the line 5—5 of FIGURE 1.

The nipple member 67 is provided with a nose portion 71 which has wall means 73 defining a primary passage in the nipple member and the nose portion is provided with an annular locking groove 74 on the outer surface thereof to receive the ball detents 63 and lock the nipple member and socket body together when the nose portion is inserted into the primary passage in the socket body (FIGURE 3). The nipple member 67 is provided with the same primary and secondary valving arrangement and as a result where the same structure occurs in the nipple member 67 as hereinabove described in the socket body 22, the same reference numerals have been applied thereto. The arrangement of the valving means in the nipple member as related to that in the socket body will be apparent upon review of FIGURES 1, 2 and 3.

The operation and function of the coupling of the present invention will be described hereinafter. Assuming the coupling is disconnected as shown in FIGURE 1, and high pressure gas such as air, on the order of 5000 p.s.i., is contained in the left end of the socket body 22 on the left side of the primary valve 40. It will therefore be apparent that in order to open the primary valve 40 in the socket body 22, one would normally have to overcome a total force equal to 5000 p.s.i. times the number of effective square inches area on the primary valve. To connect the coupling of this invention the nipple member 67 is brought into the position shown in FIGURE 2 whereat the portions 56 of both secondary valves 54 engage each other and because of the small effective cross section of the secondary valve which the fluid pressure acts against, it is physically possible to manually open the secondary valves by manual force. With the secondary valves 54 open and the coupling in the position shown in FIGURE 2, the high pressure in the left end of the socket body 22 at least momentarily drops substantially, because of flow through the secondary passages 50 in the primary valves 40 in both parts of the coupling, and continued manual insertion of the nipple member 67 causes the primary valves to be opened because of engagement of the extensions 45. Coupling takes place with the locking sleeve 65 in retracted condition and when the socket body and nipple member assume the position shown in FIGURE 3, the locking sleeve is returned to locked condition by means of the spring 69.

In order to disconnect the couplings, all that need be done is to move the locking sleeve to retracted position and withdraw the nipple member from the position shown in FIGURE 3 to FIGURE 1. The same advantages will be apparent assuming that the high pressure, before connection, appears in the nipple member on the right side of the primary valve 40 as seen in FIGURE 1 as distinguished from being in the socket body. The connection is made in the same manner. It of course will be apparent that if, in a given installation, the high pressure will always be on one given side of the coupling, it is not necessary to have a valving arrangement in the other half of the coupling. In other words, assuming that the high pressure would always occur in the socket body portion, then it would be only necessary that a member or abutment be provided in the nipple member to actuate the opening of the secondary valve 54 in the socket body half and permit bleeding off of the high pressure from the socket body to the nipple member upon initial insertion of the nipple member. The various sealing members in the coupling have not been described in detail because their function will be apparent from their relative positions as seen in the drawings.

It will therefore be apparent from the hereinabove described structure and operation that all of the advantages and objectives as herein above stated are carried out with the resultant provision of a coupling of extremely advantageous structure and function.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A quick connect coupling connectable at high fluid pressures comprising a socket body having inner and outer surfaces with said inner surface defining a primary passage extending therethrough, wall means defining a primary valve seat in said primary passage, a valve guide and stop positioned in said primary passage and comprising a central portion with an opening therethrough and having a plurality of angularly spaced arms extending generally radially of said primary passage to engage with said inner surface thereof, an adapter threadably secured to said socket body and engaging said valve guide and stop to hold the same in position, a primary valve movable between open and closed positions relative to said primary valve seat, first spring means constantly urging said primary valve to closed position, said primary valve having first and second axial extensions with said second axial extension residing in said opening in said central portion of said valve guide and stop, wall means defining a secondary passage extending through said primary valve and first and second axial extensions, wall means defining a secondary valve seat in said secondary passage, a secondary valve movable between open and closed positions relative to said secondary valve seat and in closed position having a portion extending axially outwardly a slight distance beyond the end of said first axial extension, second spring means constantly urging said secondary valve to closed position, said secondary valve being substantially smaller in cross section than said primary valve, wall means defining a plurality of circumferentially spaced detent receiving sockets extending from said outer surface of said socket body to said inner surface thereof, detents located in each said socket and being projectable into and out of said primary passage, a locking sleeve surrounding said detents and movable between a locked position whereat said detents are maintained projected into said primary passage and an unlocked position whereat said detents may be moved radially outwardly out of said primary passage, a locking spring constantly urging said locking sleeve to said locked position, a nipple member having a nose portion and wall means defining a primary passage extending therethrough, said nose portion having a locking groove on the outer surface thereof to receive said detents and lock said nipple member and socket body together when said nose portion is inserted into said primary passage in said socket body, said wall means in said nipple member defining a primary valve seat in said primary passage, a valve guide and stop positioned in said primary passage and comprising a central portion with an opening therethrough and having a plurality of angularly spaced arms extending generally radially of said primary passage to engage with said inner surface thereof, an adapter threadably secured to said socket body and engaging said valve guide and stop to hold the same in position, a primary valve movable between open and closed positions relative to said primary valve seat, first spring means constantly urging said primary valve to closed position, said primary valve having first and second axial extensions with said second axial extension residing in said opening in said central portion of said valve guide and stop, wall means defining a secondary passage extending through said primary valve and first and second axial extensions, wall means defining a secondary valve seat in said secondary passage, a secondary valve movable between open and closed positions relative to said secondary valve seat and in closed position having a portion extending axially outwardly a slight distance beyond the end of said first axial extension, second spring means constantly urging said secondary valve to closed position, said secondary valve being substantially smaller in cross section than said primary valve, insertion of said nipple member into said socket body in the unlocked position of said locking sleeve causing engagement of said portions of said secondary valves in said nipple member and socket body and opening of same whereby fluid under pressure upstream of either of said primary valves passes through said secondary passages to the downstream side of said primary valves lowering the upstream pressure and force on the primary valve upstream whereby continued insertion of said nipple member causes engagement of said first axial extension of said primary valves and opening of said primary valve upstream and said primary valve downstream.

References Cited

UNITED STATES PATENTS

| 3,251,379 | 5/1966 | LeBow | 137—614.6 |
| 2,735,696 | 2/1956 | Omon | 137—614.05 |
| 3,234,965 | 2/1966 | Anderson | 137—614.04 |
| 3,336,944 | 8/1967 | Anderson | 137—614.04 |

FOREIGN PATENTS

| 680,159 | 2/1964 | Canada. |
| 887,802 | 1/1962 | Great Britain. |
| 617,518 | 2/1961 | Italy. |

WILLIAM F. O'DEA, Primary Examiner

HOWARD M. COHN, Assistant Examiner

U.S. Cl. X.R.

137—614.05, 630.15